Sept. 30, 1969  J. E. DORRIS  3,469,810
BEAM CLAMP
Filed Jan. 31, 1968  3 Sheets-Sheet 1

INVENTOR.
Joseph E. Dorris
BY
*B. B. Olive*
ATTORNEY

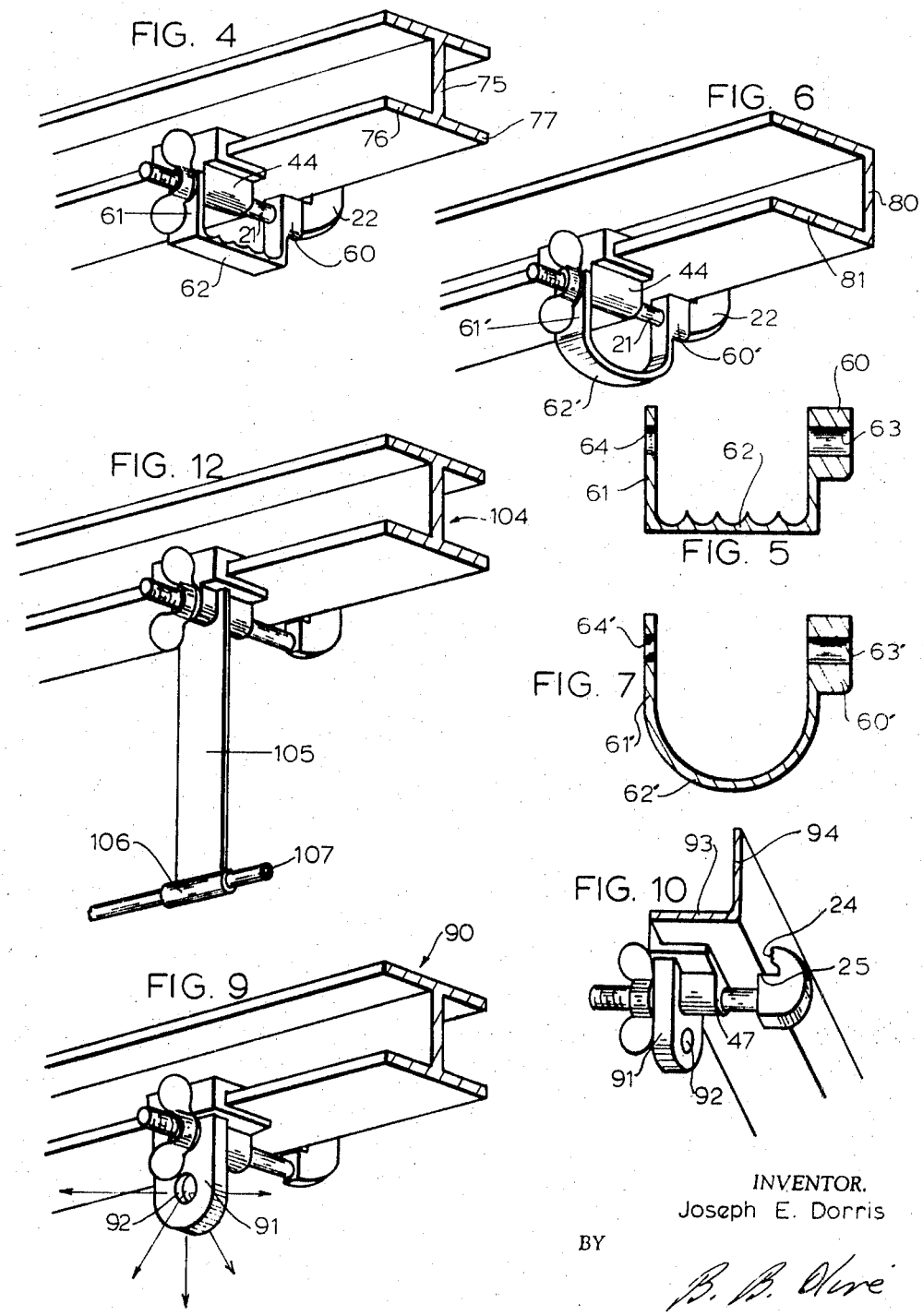

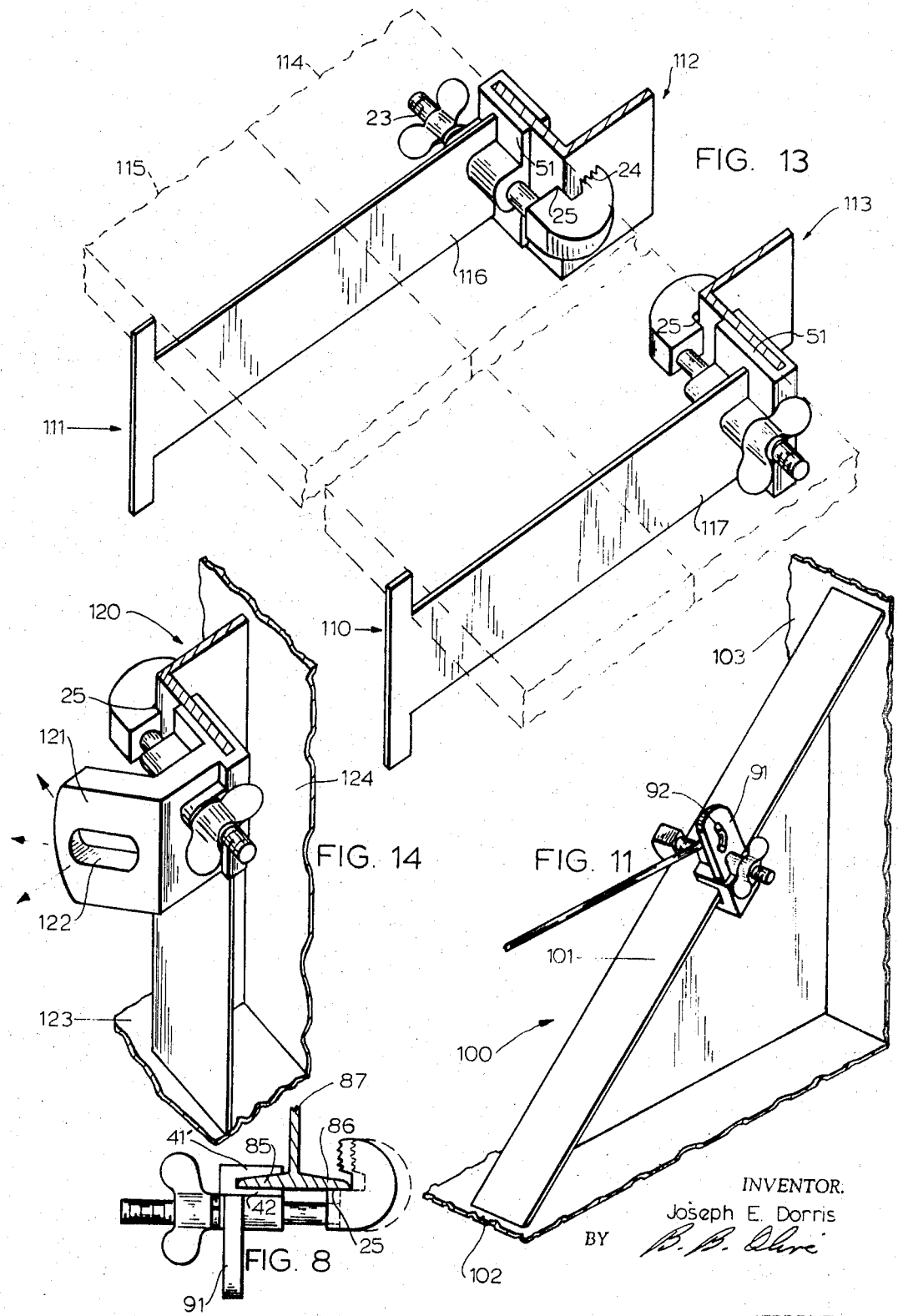

United States Patent Office 3,469,810
Patented Sept. 30, 1969

3,469,810
BEAM CLAMP
Joseph E. Dorris, 252 Park Terrace,
Mobile, Ala. 36601
Continuation-in-part of application Ser. No. 584,281,
Oct. 4, 1966. This application Jan. 31, 1968, Ser.
No. 702,083
Int. Cl. F16b 2/02
U.S. Cl. 248—228                          9 Claims

ABSTRACT OF THE DISCLOSURE

A structural clamp adapted for positive attachment to I-beams, H-beams, T-bars, conventional angles, bulb angles, channels, flanges, plates and other similar structural shapes comprises a pair of clamping jaw members effective to positively grip various combinations of beam flanges and webs and to withstand load forces from various directions and which can be installed and removed without the aid of auxiliary tools.

CROSS REFERENCE TO RELATED APPLICATION

This application is a continuation-in-part of pending application Ser. No. 584,281, entitled "Scaffold Supports," filed Oct. 4, 1966, and now abandoned.

BACKGROUND OF THE INVENTION

Field of the invention

The invention relates broadly to clamps and particularly to clamps of the type which include means for gripping structural members and supporting a load. More specifically, the invention is directed to clamps of the type having adjustable gripping means for application to various sizes and shapes of structural members and which will support a large range of loads.

Description of the prior art

There is in the construction field a need for a versatile means of positively securing, frequently for a temporary purpose, conduit, pipes, wiring, chain hoists, scaffolding, etc. to the framework of a structure which may for example include I-beams, H-beams, T-bars, bulb angles, flanges, plates or channels. Because of load limitations, space and weight limitations, possible accidents due to insecure clamps, unskilled labor and other working requirements there has arisen a general need for a single clamp which can adapt to any of the many common structural shapes and to the various and sundry work conditions.

The shipbuilding industry, in particular, has long sought an inexpensive and safe means for erecting scaffolding during construction. It has been the practice, for example, to cut angles, small plates and similar load supports from steel plate, hold the angle or other piece at the worksite and weld the piece into position as a temporary scaffold support means. After the inside work and painting aboard ship is concluded and the supports are no longer needed, the angles must be removed, excess weld chipped and ground away, and the necessary touch up painting completed. It is obvious, that there is an ever present danger of fire and explosion when welding is being carried on in such closed areas. While welding cannot be completely eliminated under present shipbuilding practices, it is desirable to reduce such welding as much as possible. In addition to other considerations, welding causes expansion and contraction problems and frequently leads to a tieup of workers who must wait while welding is being done before such workers can carry out their painting and other duties.

In cargo hauling on land and sea and in the air, there is a further need for having movable shelves and tiedowns. According to prior art practices, such shelves and tiedowns are necessarily permanent in nature and oftentimes will not accommodate to certain size and shape articles or tiedown needs.

The prior art is replete with various types of clamps and hangers. However, the prior art structures are generally limited in their load carrying capacity, in their range of use in requiring the use of tools for assembly and disassembly and frequently have the cost and manufacturing disadvantage of being relatively complex in design. Usually, the prior art devices are only adapted to one particular beam, angle or other structural shape and generally can only support a downward force. Also, the prior art has failed to establish a rugged support clamp or hanger basic structure which can work with any of the many types of required load supports.

As an example of the prior art, Patent No. 1,470,642 to W. A. Ready discloses a "Clamp Support" which lacks many desired qualities. When working in an area of limited overhead space, for example, users of the Ready clamp support encounter difficulty in tightening the screw which holds the beam flange within desired slots. Ready's clamp also requires the use of tools for installation and is limited as to the work operations which can be accomplished.

Patent No. 2,674,429 to C. H. Webster presents a "Hanger Bracket" generally capable of functioning only with I-beams.

H. E. Barber, in Patent No. 1,652,695, presents an "Attachment Clamp for Beams" designed to carry only a downward load and which requires additional tools for installation. The Barber clamp cannot be used in extremely close quarters and should the load supporting nut work loose, the load on the Barber clamp will immediately drop.

From the foregoing examples, it can be readily seen that while many and varied clamps appear in the prior art, no suitable clamp for a wide range of structural shapes or loads has yet been provided.

SUMMARY OF THE INVENTION

A structural clamp according to the invention uses a basic structure which includes a first clamping member having an integral jaw block and threaded shaft of a predetermined length, a second clamping member having an integral jaw clamp which includes a pair of flange guide plates, an end plate and a sleeve mounted on the bottom of one of the plates and which sleeves fits on the shaft. A wing nut is threadably mounted on the shaft and when tightened acts to bring the two clamping members together for the purpose of gripping either a pair of opposed flanges, a flange and web or a web having a bulb. The notch provided by the jaw block and the slot provided by the jaw clamp accommodate to various flange and web shapes. The jaw block even if it becomes slightly loose will not cause the clamp of the invention to drop because of the particular forms chosen for the two clamping members. The basic structure adapts to a variety of different types of load support devices such as cargo tiedowns, scaffold and shelving supports, pipe and conduit supports and the like. The clamp allows for quick manual disassembly without requiring tools when it is desired to move the clamp to a new location.

An object of this invention is to provide a structural clamp adapted to be secured to horizontal, vertical, and angularly positioned I-beams, H-beams, T-bars, conventional angles, bulb angles, channels, flanges, plates, and any similar structural shape.

A further object is to provide a structural clamp which is constructed of a minimum number of parts and which can be both assembled and disassembled without having to employ any type of auxiliary tool.

Another object is to provide a structural clamp which will support a wide range of loads and independent of direction of the load.

Another object is to provide a basic clamp structure suited to many and various forms of load bearing devices which can be supported from such basic structure.

Another object is to provide a structural clamp which can be installed under very close working conditions such as where it is desired to clamp to an angle located next to a bulkhead.

A further object is to prove a structural clamp which should it become slightly loosened is adapted to remain on the member to which it is clamped and thereby avoid release of any load being supported by the clamp.

The foregoing and other objects will appear from the drawings and description to follow:

DESCRIPTION OF THE DRAWING

FIGURE 4 is a perspective view showing an auxiliary plural conduit bracket supported by the basic structure and the basic structure clamped to an I-beam.

FIGURE 5 is an elevation section view of the plural conduit bracket shown in FIGURE 4.

FIGURE 6 is a perspective view showing an auxiliary pipe holder bracket supported by the basic structure and the basic structure clamped to the flange of a channel.

FIGURE 7 is an elevation section view of the pipe holder bracket shown in FIGURE 6.

FIGURE 8 is a fragmentary elevation view partially in section of an alternate embodiment of the basic structure clamped to a beam having tapered flanges and in a partially disengaged position in dashed lines.

FIGURE 9 is a perspective view of an alternate embodiment showing the basic structure mounted on an H-beam and a hoisting or lifting pad formed as a web like integral appendage to the basic structure and indicating with arrows various possible force directions.

FIGURE 10 is a perspective view of the FIGURE 9 clamp structure mounted on an angle and illustrating the serrated surface bearing against the web of the angle.

FIGURE 11 is a fragmentary perspective view of the clamp structure of FIGURES 9 and 10 shown mounted on a so-called "flange" or brace typical to ship construction.

FIGURE 12 is a perspective view showing the basic structure clamped to an H-beam and an elongated plate formed as an integral appendage to the basic structure and with the free terminal end of the plate formed as a tube to support single conduit pipe and the like.

FIGURE 13 is a perspective view of a further embodiment of the invention, similar to FIGURE 12, and showing a pair of the basic structures clamped to a pair of spaced angles and on each basic structure a plate like appendage formed at the terminal end in a T configuration for use as invertible scaffold, shelving support and the like.

FIGURE 14 is another embodiment of the invention similar to FIGURE 9 illustrating an angular tie down pad or bracket formed as an integral appendage to the basic structure.

DESCRIPTION OF THE PREFERRED EMBODIMENTS

Figure 1:
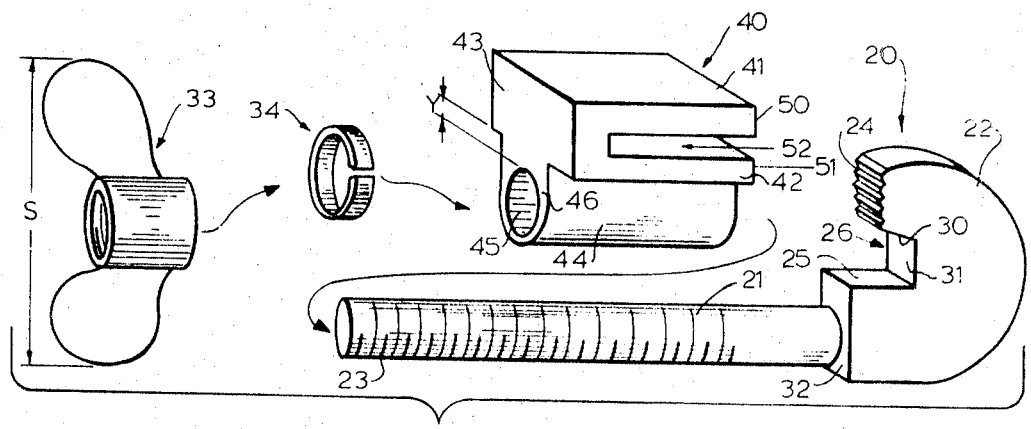
FIGURE 1 is an exploded perspective view of the components of a basic clamp structure made according to the invention.

The structural clamp of the invention comprises as one component what is referred to as a "basic structure" which can be clamped to any of the mentioned structural shapes and as a second component any of various structural support devices which can either be integrally formed with the basic structure or which are detachably mounted on and supported from the basic structure. FIGURE 1 shows the basic structure in an exploded view from which it can be seen that the basic structure includes a first clamping member 40 and a second clamping member or assembly 20. The first clamping member is formed as an integral structure and for purpose of the description can be said to be formed from a pair of opposed rectangular guide plates 41, 42 joined by an end plate 43 which is arranged perpendicular to the guide plates. These plates form a U-shaped "jaw clamp" providing a slot 52 which conforms to and is adapted to fit the cross-sectional shape of a selected flange forming part of some structural shape such as an I-beam or angle. The area and general shape of plates 41, 42 are selected so that the jaw clamp will fit over a major portion of the width and a minor portion of the length of the particular beam or the like to which the clamp is being secured.

The first clamping member 40 includes as a further integral portion a sleeve 44 having a bore 45 whose axis is generally perpendicular to the end plate 43. Sleeve 44 is formed integral with and centrally of the outer surface of guide plate 42. One end surface 46 of sleeve 44 is flush with the outer surface of end plate 43 and the end surface 47 of sleeve 44 is flush with two inner edge surfaces 50, 51 of guide plates 41, 42, respectively. The fact that the various surfaces are flush allows the first clamping member to be tightened when in a normal flange engaging position, e.g., FIGURE 4, or when reversed in a nonflange engaging position, e.g., FIGURE 15. The upper edge of bore 45 is preferably below the lower edge of end plate 43 a distance Y (FIGURE 1) which should be approximately ⅛". The purpose of this offset dimension is best illustrated with FIGURE 13 from which it will be seen that this offset prevents paint drippings and the like from gumming the tightening threads.

Figure 15:
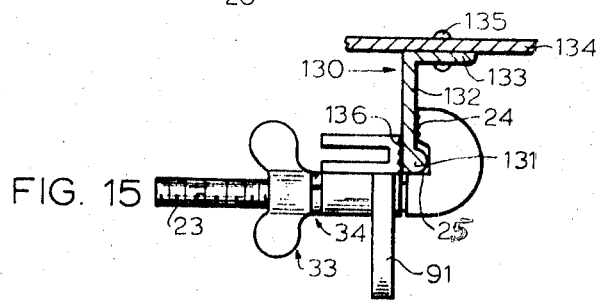
FIGURE 15 shows the jaw clamp reversed from its normal position, the end plate provided with a serrated surface, the basic structure clamped to a bulb-type angle and the basic structure provided with a tie form pad or bracket similar to that of FIGURE 14.
Figure 2:
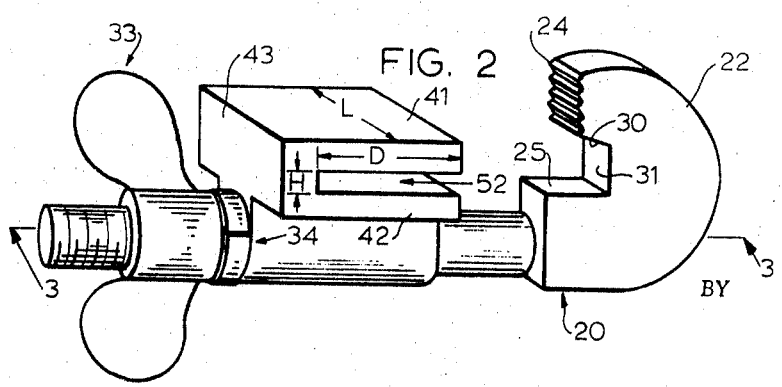
FIGURE 2 is a perspective view showing the FIGURE 1 structure assembled.

While the form of the basic structure jaw clamp component illustrated by FIGURES 1 and 2 in particular will accommodate to the majority of the structural shapes on which clamps are desired the jaw clamp component lends itself also to the form illustrated in FIGURE 8 in which the guide plates 41 and 42 are formed so as to accommodate to a flange of tapered cross-section. In FIGURE 15 a further modification of the jaw clamp component is illustrated in which the end plate 43 is formed with a serrated surface 136 which allows accommodation to a bulb angle shape.

The second component of the basic structure is the previously referred to second clamping member assembly 20 which includes an integral jaw block member having a portion formed as a shaft 21 with threads 23 and a further portion formed as a jaw block 22. Jaw block 22 provides a notch 26 and is formed by a base surface 25, a back surface 31 extending outwardly from surface 25 and a sloping surface 30. A further serrated surface 24 extends outwardly from notch 26 and generally perpendicular to base surface 25. It will also be noted that the serrated surface 24 is offset outwardly by a distance X from the front edge of base surface 25 defined by its intersection with the front jaw block surface 32 from which shaft 21 extends. This offset, which is preferably about ¼″, has been found to be particularly useful since it allows the base surface 25 to underlie the particular surface being clamped, see, e.g., FIGURES 8, 10, 13 and 14. Thus, even though the clamp of the invention becomes slightly loose as illustrated in FIGURE 8 by the dotted line position, the jaw block 22 will not swivel since the base surface 23 cannot rotate and will continue to engage the particular flange, web or the like. To complete the description of the second main component of the basic structure, i.e., the second clamping member assembly, the described shaft 21 fits in the bore 45 of sleeve 44 and the threads 23 receive a wing nut 33 which is tightened against a lock washer 34, notch 26 engaging a selected flange edge, a web or angle bulb.

A wide choice of materials and sizes are available for the basic structure. In one embodiment the entire first clamping member, i.e., plates 41, 42, 43 and sleeve 44 are cast of series 304 stainless steel, slot 52 is approximately 1¾″ deep (dimension D, FIGURE 2), 3″ long (dimension L, FIGURE 2) and ⅜″ high (dimension H, FIGURE 2). In this same embodiment the overall length of the shaft 21 and jaw block 22 is about 7″, the threaded portion of shaft 21 is approximately 3¼″ long, the diameter of shaft 21 is ¾″ and a wing nut 33 having a span S (FIGURE 1) is employed. Such an arrangement allows the basic structure to be clamped into position on many and varied shapes and to be rigidly secured without requiring any type of hand tool or other tightening means.

Figure 3:
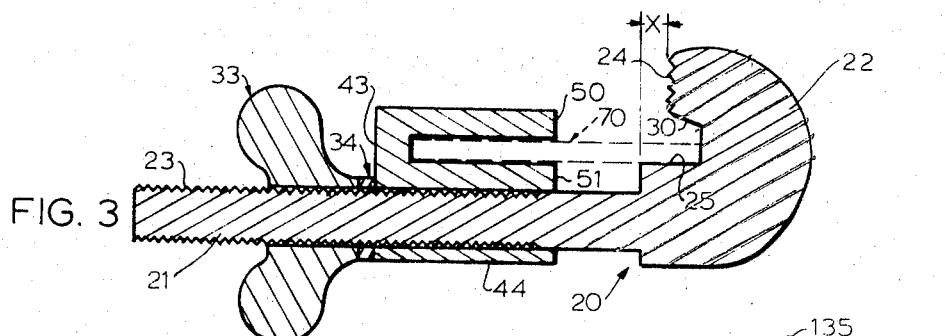
FIGURE 3 is a sectional elevation view taken along line 3—3 of FIGURE 2 and showing the basic structure clamped on a plate indicated in dashed lines.

Various embodiments and practical applications of the basic structure will be described in connection with the remaining figures. In all instances it may be observed that when the jaw block and jaw clamp are oppositely disposed and in their normal operative positions the jaw clamp notch 52 is designed to fit over either a flange or web and the jaw block notch 26 is designed to fit over either an oppositely disposed flange (as in FIGURE 4), over a bulb (as in FIGURE 15), or against and outwardly of another flange or web (as in FIGURE 10). While the terms "web" and "flange" are used for purposes of reference the terms are considered to be interchangeable so far as the description is concerned and to refer to any flange or web like portion of a structural shape to which the basic structure is adapted. In FIGURE 3, for example there is represented in dashed lines, a plate 70 to indicate how the basic structure may grip and clamp a plate, and in this instance the plate 70 may be considered to comprise two oppositely disposed "flange" portions.

One of the most important applications of the basic structure is its use as a clamp for clamping to various shapes simply to provide means to support a hoist, provide a cargo tiedown pad and the like. For this purpose, the jaw clamp 40 may include as an integral portion an auxiliary pad or web 91 having an aperture 92 and which as best illustrated in FIGURE 9 is adapted to receive force from essentially any direction normally encountered in structural applications. The complete versatility of the clamp of the invention can also be seen by noting its application to an I- or H-type beam, FIGURE 8 showing a beam having tapered flanges 85, 86 and a web 87 and FIGURE 9 showing a typical beam 90, conventional angle having a flange 93 and web 94 in FIGURE 10, to a reinforcing plate 100 having a turned edge 101 and secured, usually by welding, to walls 102, 103 (this type of structural shape being sometimes loosely referred to among steel workers as a "flange"), and to a bulb angle 130 having a web 132, a flange 133, a bulb 131 and which is shown in a typical arrangement secured by rivet 135 to a wall 134. (Also see FIGURES 11 and 15.)

A variation of the embodiment just referred to is illustrated in FIGURE 14 in which the web 121 has an aperture 122 and is shown adjustably clamped to an angle 120 secured to walls 123 and 124. What is intended to be illustrated by FIGURES 14 and 15 in addition to the structure shown is also an illustration of the typically close working quarters to be found on the job. One basic disadvantage of prior art clamps in addition to the fact that they are not generally adapted to more than one structural shape is that they require hand tools for clamping and in this regard are not adapted to close working conditions. The clamp of the invention on the other hand as illustrated by the figures referred to is not only adapted to the various shapes but is easily maneuvered into position and securely clamped in close working conditions without requiring any type of tightening tool. Furthermore, even if the clamp becomes slightly loose on the particular shape as previously mentioned in connection with the loose, dashed line position in FIGURE 8, the basic structure will not lose its grip on the beam, angle or the like since the base surface 25 continues to engage the particular shape being gripped.

Another category of devices which may be integrally formed with the basic structure are illustrated by FIGURES 12 and 13 in which the appendage to the basic structure takes the form of a plate such as plate 105 in FIGURE 12 having a free terminal end configuration in the form of a pipe 106 designed to support single wires, conduit and the like from an I-beam 104. In FIGURE 13 there is illustrated a pair of angles 112, 113 having a pair of the clamps made according to the invention and in which the appended plates take the form of T configurations which are invertible and designed to receive scaffold boards 114, 115, shelving and the like. In the example of FIGURE 13 it will also be noted that the width of the respective plates 116, 117 are slightly less than the L length (FIGURE 2) of the respective guide plates 51 which allows the scaffold board to stop against the outer surface of the respective guide plate 51 and thereby prevent paint drippings and the like from reaching the threads 23 because of the previously mentioned offset dimension Y in FIGURE 1.

Another category of devices which may be used with the basic structure but without being integrally formed with the basic structure is illustrated in FIGURES 4, 5, 6 and 7. In this type of device there is provided an integral U-shaped member having a support block 60 (FIGURES 4 and 5) or 60' (FIGURES 6 and 7) with an aperture 63 or 63' and a strap portion 61 or 61' having an oppositely disposed aperture 64 or 64' and an integral loop connecting member 62 or 62'. In the case of FIGURES 4 and 5 it will be noted that block 60 and strap portion 61 are designed to fit over shaft 21 with block 60 being against the jaw block 22 and the strap portion 61 being against the outer surface of sleeve 44. The connecting loop 62 in the case of FIGURE 4 is designed to accommodate plural conduit, pipe, wires and the like whereas in the case of the embodiment of FIGURES 6 and 7 the loop 62' is designed to receive a single pipe, conduit or the like. In either case it can be seen that the basic structure can still be secured to any of the various shapes such as the I-beam, FIGURE 4, having web 75 and flanges 76, 77 or the FIGURE 6 channel having flange 81 and web 80.

The adaptability to a bulb angle has been previously referred to in connection with FIGURE 15 and in this regard it will be noted that the jaw clamp 40 may be clamped against the bulb angle web 132 either with jaw clamp 40 in its normal position, e.g., as in FIGURE 3, or with the jaw clamp 40 reversed as in FIGURE 15. In the latter case it has been found that with the serrated surface 136 a particular secure grip is obtained. In either mode of operation and with or without serrated surface 136 the clamp of the invention readily adapts to bulb angles in addition to all of the other shapes to which reference has been made.

From the foregoing it can be seen that the invention provides a practical and extremely versatile clamp structure and a clamp structure which provides in a single structure all of the various desired features previously found scattered in the art. Compared to the prior art it can be seen that the clamp of the invention can be clamped into position without hand tools. All of the commonly known structural shapes may be used for securing. The clamp of the invention furthermore can be positioned in extremely close working quarters and in the event vibration or the like causes it to loosen slightly it can be depended upon not to fall and cause accidents as with prior art clamps. The invention can of course be expected to vary somewhat from the exact forms disclosed as those skilled in the art learn to adapt the invention to various applications but without departing from the spirit and scope of the invention.

What I claim is:

1. A structural clamp adapted to be hand secured to either horizontal, vertical or angularly positioned I-beams, H-beams, T-bars, bulb angles, conventional angles, channels, flanges or any similar structural shape which provides either a pair of opposed flanges as in an I-beam or provides a perpendicular flange and web as in an angle or provides a single web with a bulb along its free edge as in a bulb angle, comprising:

(a) first and second oppositely disposed clamping members adapted to simultaneously grip therebetween either a pair of said flanges, an integral flange and web or a single web and bulb, (1) said first clamping member being comprised of a pair of opposed thick rectangular solid metal flange guide plates integrally joined by a thick rectangular solid metal end plate arranged perpendicular to the guide plates and forming a U-shaped jaw clamp having a slot extending from substantially coplanar inner edge surfaces of said guide plates to an inner surface of said end plate, said slot conforming in shape to the cross-sectional shape of a selected flange and adapted to receive and fit with substantially small play over a major portion of the width and a minor portion of the length of the selected flange, a cylindrical thick walled solid metal sleeve formed integral with said plates of the same homogeneous metal and having a bore arranged perpendicular to said end plate, said sleeve being on and centrally of the outer surface of a selected one of said guide plates, one end surface of said sleeve being substantially flush with the outer surface of said end plate and the other end surface of said sleeve being substantially flush with the guide plate inner edge surfaces, (2) said second clamping member comprising a threaded shaft adapted to loosely and rotatably fit and extend through said sleeve bore and integral therewith opposite the threaded end thereof and formed solidly of the same homogeneous metal as said shaft a jaw block and on said shaft a tightening nut such that when said shaft is in said sleeve and said jaw block is disposed opposite said jaw clamp slot said nut can be hand tightened to cause said first clamping member to slide on said shaft and bring said jaw block and jaw clamp into operative positions, said jaw block providing a generally U-shaped notch positionable opposite and centrally of said slot and including a flat base surface and a frictional surface extending outwardly from said notch perpendicular to and intermediate of said base surface, said notch being adapted to either receive and fit over a minor edge portion of another opposed selected flange in a first mode, over the bulb on a web edge in a second mode or outwardly of a web on a flange in a third mode and in all said modes said notch conforming with substantially small play, said base surface being adapted to extend inwardly beyond the outermost edge of the respective flange, bulb or web being gripped as the case may be and in said second and third modes said frictional surface being adapted to frictionally engage the surface of said web; and (b) support means secured to and depending from said clamping members such that when said clamping members are in gripping relation on a selected structural shape and a support force is asserted on said support means said force may be transmitted to said selected shape through said clamping members and in a substantially large load value from any of various horizontal, vertical or angular directions.

2. A structural clamp as claimed in claim 1 wherein said support means comprises an auxiliary web member formed integral with said plates and sleeve of the same solid homogeneous metal and extending outwardly of and perpendicular to said sleeve and including an aperture, said auxiliary web member being adapted to serve as a hoist support, cargo tiedown and the like.

3. A structural clamp as claimed in claim 1 wherein said support means comprises an auxiliary plate member extending outwardly of and perpendicular to said sleeve and being formed integral therewith, the free terminal end being of a predetermined configuration adapted to support a selected separate piece.

4. A structural clamp as claimed in claim 3 wherein said terminal end configuration is in the form of a tube adapted to receive and support conduit, pipe and the like pieces.

5. A structural clamp as claimed in claim 3 wherein said terminal end configuration is in the form of a T configuration and said auxiliary plate member is adapted to support scaffold boards and the like.

6. A structural clamp as claimed in claim 1 wherein said support means comprises an auxiliary U-shaped member designed to support pipe, plural conduit and the like, said auxiliary member having a support block with an aperture therein and being adapted to be supported by said second clamping member shaft adjacent said jaw block and a strap portion having an aperture positioned opposite said support block aperture and being adapted to be supported on said shaft outwardly of said sleeve and having an integral loop support member extending between said support block and said strap portion.

7. A structural clamp as claimed in claim 1 wherein the outer surface of said end plate provides a frictional surface such that said first clamping member may be reversed on said shaft from its normal position and said end plate-frictional surface engaged with a web surface and the like.

8. A structural clamp as claimed in claim 1 wherein said support means comprises an auxiliary U-shaped member designed to support pipe, conduit and the like, each end of said auxiliary member being provided with an aperture adapted to be supported by said second clamping member shaft and at least one end of said auxiliary member being adapted for positioning in the space between said jaw block and sleeve when said first and second clamping members are in operative position on said selected structural shape.

9. A structural clamp as claimed in claim 1 wherein said support means comprises an auxiliary web member formed integral with said plates and sleeve of the same solid homogeneous metal and extending outwardly of said sleeve and including an aperture, said auxiliary web member being adapted to serve as a hoist support, cargo tiedown and the like.

(References on following page)

References Cited

UNITED STATES PATENTS

| | | | |
|---|---|---|---|
| 964,376 | 7/1910 | Blackburn | 248—226 X |
| 1,470,642 | 10/1923 | Ready | 248—226 |
| 2,049,893 | 8/1936 | Chicoine | 248—221 |
| 2,341,048 | 2/1944 | Kopp | 248—226 |
| 2,364,477 | 12/1944 | Sayles et al. | 248—205 |
| 2,415,286 | 2/1947 | Hyde. | |
| 2,492,586 | 12/1949 | Lawrence | 248—226 |
| 2,726,880 | 12/1955 | Klein | 248—226 X |
| 2,865,585 | 12/1958 | Beyer et al. | 248—57 X |
| 2,958,760 | 11/1960 | McNally | 248—226 X |

ROY D. FRAZIER, Primary Examiner

S. FRANKLIN FOSS, Assistant Examiner

U.S. Cl. X.R.

248—214, 245